United States Patent [19]

Prantl et al.

[11] Patent Number: 6,096,797
[45] Date of Patent: Aug. 1, 2000

[54] RADIATION-CURABLE BINDER FOR PRINTING INKS

[75] Inventors: Bernhard Prantl, Worms; Erich Beck, Ladenburg; Rainer Königer, Ludwigshafen; Edmund Keil, Heuchelheim; Matthias Lokai, Enkenbach-Alsenborn; Wolfgang Reich, Maxdorf, all of Germany

[73] Assignee: BASF Aktiengesellschaft, Ludwigshafen, Germany

[21] Appl. No.: 09/144,988

[22] Filed: Sep. 1, 1998

[30] Foreign Application Priority Data

Sep. 10, 1997 [DE] Germany ............... 197 39 620

[51] Int. Cl.⁷ ....................................... C08F 2/46
[52] U.S. Cl. ................................................. 522/174
[58] Field of Search ............................... 522/174

[56] References Cited

U.S. PATENT DOCUMENTS 5,182,324  1/1993  Osada et al. ..................... 524/379
5,496,591  3/1996  Lang et al. ....................... 427/520

FOREIGN PATENT DOCUMENTS

| 0 386 650 | 9/1990 | European Pat. Off. . |
| 0 464 466 | 1/1992 | European Pat. Off. . |
| 2 251 433 | 4/1974 | Germany . |
| 25 58 482 | of 1977 | Germany . |

Primary Examiner—Terressa M. Boykin
Attorney, Agent, or Firm—Oblon, Spivak, McClelland, Maier & Neustadt, P.C.

[57] ABSTRACT

A mixture comprising a condensation resin A) constructed from urea or urea derivatives $a_1$) and ketones or aldehydes $a_2$) selected from acidic-CH aldehydes or ketones and their mixtures with formaldehyde, and a radiation-curable compound B) having at least 2 acryloyl or methacryloyl groups is useful in offset printing.

12 Claims, No Drawings

RADIATION-CURABLE BINDER FOR PRINTING INKS

DESCRIPTION

The present invention relates to a mixture comprising a condensation resin A) constructed from urea or urea derivatives $a_1$) and ketones or aldehydes $a_2$) selected from acidic-CH aldehydes or ketones and their mixtures with formaldehyde, and a radiation-curable compound B) having at least 2 acryloyl or methacryloyl groups.

Printing inks consist essentially of a binder and a pigment. In the case of radiation-curable binders, the printing ink is cured by irradiation with high energy light or electron beams after printing. DE-A-2 251 433 discloses radiation-curable binders containing mandatory acrylamide groups. Binders comprise a resin which is soluble in organic liquids.

DE-A-2 558 482 describes a radiation-curable binder obtained by reaction of amine/formaldehyde condensates with hydroxyl-containing (meth)acryloyl compounds.

Prior art radiation-curable binders frequently fail to provide adequate pigment wetting, which leads to insufficient pigment uptake on the part of the binder, to high viscosities, to a high yield point and to inadequate application properties on the part of the printing ink. The yield point is the load or shearing force at which the printing ink starts to flow. It is naturally desirable that the force required should be as low as possible in order that the printing ink may be readily processible on printing presses.

Prior art printing inks further generally lack adequate blocking resistance, ie. printed papers in stacks, for example, stick to each other.

Prior art printing inks provide unsatisfactory printing performance, especially in offset printing. Offset printing requires the presence of water. To obtain a crisp print, the addition of water frequently has to be accurately controlled and the quantitative ratio of printing ink/water kept constant. It is desirable to have printing inks which still produce a consistently good and crisp image when the supply of water is high or low or nonuniform.

It is an object of the present invention to provide binders and printing inks free of the above disadvantages.

We have found that this object is achieved by the mixture defined at the beginning and the use of the mixture as a binder in printing inks.

The condensation resin A) is constructed from urea or urea derivatives $a_1$) and ketones/aldehydes $a_2$).

The urea or urea derivatives in question are especially those of the formula

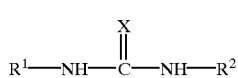
I or of the formula

II where $R^1$ and $R^2$ are each independently of the other hydrogen or $C_1$–$C_{20}$-alkyl, A is $C_1$–$C_{10}$-alkylene and X is oxygen or sulfur.

Preferably, $R^1$ and $R^2$ are each hydrogen or $C_1$–$C_4$-alkyl, A is $C_1$–$C_4$-alkylene and X is oxygen.

Particular preference is given to compounds of the formula I.

Very particular preference is given to urea

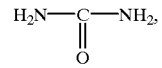

$a_2$) comprises acidic-CH aldehydes or ketones or their mixtures with formaldehyde. Preference is given to acidic-CH aldehydes and their mixtures with formaldehyde.

Acidic-CH aldehydes and ketones are aldehydes and ketones having an acidic hydrogen atom on the carbon atom which is α to the carbonyl group. Preference is given to acidic-CH aldehydes.

Examples of suitable acidic-CH aldehydes include acidic-CH aldehydes of the formula

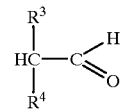
III where $R^3$ and $R^4$ are each independently of the other hydrogen or $C_1$–$C_{20}$-alkyl, preferably $C_1$–$C_{b\,6}$-alkyl, aryl or $C_7$–$C_{20}$-alkaryl, preferably $C_7$–$C_{14}$-alkaryl; formaldehyde ($R^3$ and $R^4$=H) is excluded.

Particular preference is given to a compound of the formula III having a total of less than 20 carbon atoms. Preferably, not more than one of $R^3$ and $R^4$ is alkyl, aryl or alkaryl.

An example of a suitable ketone is cyclohexanone.

Suitable compounds $a_2$) are, in particular, isobutyraldehyde, 2-ethylhexanal, 2-methylpentanal, 2-phenylpropanal and isovaleraldehyde.

Compounds $a_2$) may also be mixtures of the foregoing acidic-CH aldehydes and ketones with formaldehyde. The proportion of formaldehyde is preferably not more than 50 mol %, especially not more than 30 mol %, of said compounds $a_2$).

The condensation resin A) can be prepared, for example, by acidic condensation of the compounds $a^1$) and $a_2$) in the temperature range from 60 to 150° C. in particular. Appropriate methods are known to one skilled in the art and described in EP-A-2794, for example.

The condensation resin A) preferably contains the compounds $a_1$) and $a_2$) in a molar ratio within the range from 1:0.5 to 1:20, particularly preferably within the range from 1:4 to 1:10. The softening point (as defined in German standard specification DIN 53180) of resin A) is preferably within the range from 60 to 140° C.

The condensation resin A) is preferably present without a solvent. It may also be present, for example, as a solution in an organic solvent, for example butyl acetate, ethanol or methyl ethyl ketone.

The radiation-curable compounds B) are (meth)acrylate compounds, preferably acrylate compounds, ie. the derivatives of acrylic acid.

Preferred (meth)acrylate compounds B) contain from 2 to 20, preferably from 2 to 10, very particularly preferably from 2 to 6, acryloyl or methacryloyl groups of the formula

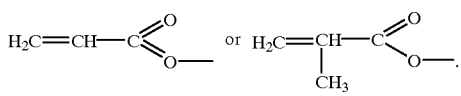

The number average molecular weight $M_n$ of the (meth) acrylate compounds B) is preferably below 15,000, particularly preferably below 5000, very particularly preferably below 3000, g/mol and above 180 g/mol (determined by gel permeation chromatography with polystyrene as standard and tetrahydrofuran as eluent).

Suitable (meth)acrylate compounds include (meth)acrylic esters, especially acrylic esters, of polyfunctional alcohols, especially those which, in addition to the hydroxyl groups, contain no further functional groups or at most ether groups (polyether (meth)acrylates). Examples of such alcohols include bifunctional alcohols, such as ethylene glycol, propylene glycol, and their more highly condensed representatives, such as diethylene glycol, triethylene glycol, dipropylene glycol, tripropylene glycol, etc., butanediol, pentanediol, hexanediol, neopentylglycol, alkoxylated phenolic compounds, such as ethoxylated or propoxylated bisphenols, cyclohexanedimethanol, trifunctional or more highly functional alcohols, such as glycerol, trimethylolpropane, butanetriol, trimethylolethane, pentaerythritol, ditrimethylolpropane, dipentaerythritol, sorbitol, mannitol and the corresponding alkoxylated, especially ethoxylated and propoxylated, alcohols.

The alkoxylation products of the alcohols are obtainable in a conventional manner by reaction of the foregoing alcohols with alkylene oxides, especially ethylene oxide or propylene oxide. The degree of alkoxylation per hydroxyl group is preferably within the range from 0 to 10, ie. 1 mol of hydroxyl group can preferably be alkoxylated with up to 10 mol of alkylene oxides.

Suitable (meth)acrylate compounds further include polyester (meth)acrylates, which are the (meth)acrylic esters of polyesterols.

Suitable polyesterols include, for example, polyesterols preparable by esterification of polycarboxylic acids, preferably dicarboxylic acids, with polyols, preferably diols. The starting materials for such hydroxyl-containing polyesters are known to one skilled in the art. The dicarboxylic acids which can be used are preferably succinic acid, glutaric acid, adipic acid, sebacic acid, o-phthalic acid, their isomers and hydrogenation products and also esterifiable derivatives, such as anhydrides or dialkyl esters. Suitable polyols include the abovementioned alcohols, preferably ethylene glycol, 1,2-propylene glycol, 1,3-propylene glycol, 1,4-butanediol, 1,6-hexanediol, neopentylglycol, cyclohexanedimethanol and also polyglycols of the ethylene glycol and propylene glycol type.

Polyester (meth)acrylates can be prepared in multiple steps or else in a single step, for example as described in EP 279 303, from acrylic acid, polycarboxylic acid, polyol.

Compounds B) may also be, for example, epoxy or urethane (meth)acrylates.

Epoxy (meth)acrylates are, for example, epoxy (meth) acrylates obtainable by reaction of epoxidized olefins or poly- or mono- or diglycidyl ethers, such as bisphenol A diglycidyl ether, with (meth)acrylic acid.

The reaction is known to one skilled in the art and described, for example, in R. Holmann, U. V. and E. B. Curing Formulation for Printing Inks and Paints, London 1984.

Urethane (meth)acrylates are especially the reaction products of hydroxyalkyl (meth)acrylates with poly- or diisocyanates (see again R. Holmann, U. V. and E. B. Curing Formulation for Printing Inks and Paints, London 1984).

It is of course also possible to use mixtures of different compounds B), including especially mixtures of the above (meth)acryloyl compounds.

The compounds B) used are preferably above-recited polyether (meth)acrylates as obtained by esterification of (meth)acrylic acid with alkoxylated alcohols.

Compounds B) are preferably liquid and are therefore simple to mix with the condensation resins A).

The mixture of A) and B) according to the present invention preferably comprises from 10 to 90% by weight, particularly preferably from 20 to 80% by weight, very particularly preferably from 40 to 60% by weight, of the condensation resin A), based on the sum of A) and B).

Correspondingly, the proportion of B) is preferably likewise within the range from 10 to 90% by weight, particularly preferably within the range from 20 to 80% by weight, very particularly preferably within the range from 40 to 60% by weight, based on the sum of A) and B).

The mixture of the present invention is especially useful as a binder for printing inks. Here the mixture can be used as sole binder or in a mixture with other binders or reactive diluents which are radiation-curable and are collectively designated component C). The proportion of such a component C) is preferably not more than 50 parts by weight, especially not more than 20 parts by weight, based on 100 parts by weight of the sum of A) and B). The use of a component C) is generally not necessary. Nor is there any need for the presence of the (meth)acrylamide groups of DE-A-225 1433 to obtain satisfactory printing inks.

The proportion of compounds having (meth)acrylamide groups is therefore preferably below 5 parts by weight, particularly preferably below 2 parts by weight, based on 100 parts by weight of the sum of components A)+B)+C).

It is particularly preferable for component B) and the printing ink as a whole not to include compounds having (meth)acrylamide groups.

The printing ink preferably includes a photoinitiator for the radiative curing with high energy light, eg. UV light, and mixtures of photoinitiators are frequently also used with advantage. Customary photoinitiators are described, for example, in R. Holmann, UV and E. B. Curing Formulation for Printing Inks and Paints, London 1984.

The total amount of photoinitiator is preferably within the range from 0.1 to 20, particularly preferably within the range from 0.5 to 12, % by weight, very particularly preferably within the range from 2 to 10% by weight, based on the total amount of free-radically and, if appropriate, cationically polymerizable compounds.

Suitable photoinitiators for free-radical polymerization include, for example, benzophenone and derivatives thereof, for example alkylbenzophenones, halomethylated benzophenones, Michler's ketone and also benzoin and benzoin ethers such as benzoin ethyl ether, benzyl ketals such as benzyl dimethyl ketal, acetophenone derivatives such as, for example, hydroxy-2-methyl-1-phenylpropan-1-one and hydroxycyclohexyl phenyl ketone. Anthraquinone and its derivatives such as methylanthraquinone and especially acylphosphine oxides such as, for example, Lucirin TPO (2,4,6-trimethylbenzoyldiphenylphosphine oxide) and bisacylphosphine oxides.

Photoinitiators for cationic photopolymerization can be used, for example, in the case of cationically polymerizable compounds C, such as epoxides and vinyl ethers, and yield acids on irradiation with UV light, suitable examples being aryldiazonium, aryliodonium or arylsulfonium salts, disulfones, diazodisulfones, imidotriflates, benzoin tosylates of the following structures:

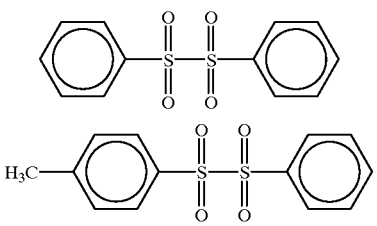

Suitable examples further include p-methoxybenzenediazonium hexafluorophosphate, benzenediazonium tetrafluoroborate, toluenediazonium tetrafluoroarsenate, diphenyliodonium hexafluoroarsenate, triphenylsulfonium hexafluorophosphate, benzenesulfonium hexafluorophosphate, toluenesulfonium hexafluorophosphate or Degacure KI85 (bis[4-diphenylsulfoniophenyl] sulfide bishexafluorophosphate), isoquinolinium salts, phenylpyridinium salts or picolinium salts, for example N-ethoxyisoquinolinium hexafluorophosphate, N-ethoxy-4-phenylpyridinium hexafluorophosphate or N-ethoxy-2-picolinium hexafluorophosphate. Ferrocenium salts (eg. Irgacure 261 from Ciba) or titanocenes are also suitable.

Photoinitiators are not required for electron beam curing.

Printing inks include pigments as essential constituent as well as the binder.

The pigment content is preferably within the range from 5 to 100 parts by weight, preferably within the range from 5 to 50, particularly preferably within the range from 10 to 40, parts by weight, based on 100 parts by weight of binder, ie. sum of the components A), B) and C).

Examples of suitable pigments include titanium dioxide, chrome yellow, ®Heliogen Blue or ®Heliogen Green, ®Lithol Rubine, ®Sico Yellow, etc.

Further additives for possible inclusion in the printing inks are, for example, waxes, flow agents, defoamers, wetting agents, adhesion promoters, thickeners and fillers.

The printing inks can be processed in customary printing processes, for example flexographic printing, screen printing, letterpress printing, gravure printing or tampon printing. The printing inks of the present invention are especially useful for offset printing. They are useful for prints on paper and cardboard but also on wood, metal or plastic or plastic film or sheeting composed of polyethylene, polypropylene, polystyrene, PVC, PET, etc.

After printing, the print is cured using high energy light or electron beams.

The mixture of the present invention and the printing ink of the present invention have high stability in storage. The mixture of the present invention and the printing ink have good reactivity in radiative curing. The prints obtained have high gloss.

The mixture of A) and B) according to the present invention provides particularly good pigment wetting, which leads to good attachment of the pigment to the binder and a high pigment uptake capacity. More particularly, the yield point is low, even at high viscosities.

Furthermore, printing inks comprising the mixture of the present invention have good application properties, especially good printing characteristics. Offset printing is crisp at different water feed levels.

EXAMPLES

Percentages and parts are by weight

Example 1

A mixture of 30 parts by weight of a resin derived from urea and butyraldehyde (Laropal® A81) and 70 parts by weight of the polyether acrylate Laromer® P033F is prepared by stirring the components at 80° C. 75 parts by weight of this mixture are mixed with 15% of printing ink pigment and a photoinitiator mixture of 4% of Lucirin LR 8893, 4% of Quantacure® ITX and 2% of Esacure TZT, based on the mixture, and predispersed with a dissolver at 4000 rpm for 10 min. This mixture is then dispersed three times on a three-roll mill at a constant pressure within the range from 5 to 10 bar.

Comparative Example 1A:

A mixture of 20 parts by weight of the ketone resin Kunstharz CA (cyclohexanone aldehyde resin from Hüls) and 80 parts by weight of the radiation-curable polyether acrylate Laromer P033F is prepared by stirring the components at 80° C.

75 parts by weight of this mixture were mixed with the additives as in Example 1 to form a printing ink.

Comparative Example 1B:

A mixture of 60 parts of the radiation-curable epoxyacrylate Laromer LR8819 and 40 parts of the radiation-curable polyether acrylate Laromer P033F is prepared by stirring the components at 80° C. 75 parts of this mixture were mixed with the additives as in Example 1 to form a printing ink.

Comparative Example 1C:

A mixture of 60 parts by weight of the oleic acid modified polyester acrylate Ebecryl DEC 657 (sold by UCB as a pigment wetter) and 40 parts by weight of the radiation-curable polyether acrylate Laromer P033F is prepared by stirring the components at 80° C.

75 parts by weight of this mixture were mixed with the additives as described above.

Example 2

A mixture of 15 parts by weight of a resin derived from urea and butyraldehyde (Laropal A81), 75 parts by weight of the radiation-curable, amine-modified polyether acrylate Laromer LR8894 and 10 parts by weight of the radiation-curable polyether acrylate Laromer P033F is prepared by stirring the components at 80° C. 75 parts by weight of this mixture are premixed with 15% of printing ink pigment, 4% of Lucirin LR8893, 4% of Quantacure ITX and 2% of Esacure TZT and predispersed with a dissolver at 4000 rpm for 10 min. This mixture is then dispersed (shaken) on a Skandex mixer with steel balls about 3 mm in diameter for 60 min. 200 parts by weight of steel balls are used per 100 parts by weight of printing ink. After dispersion, the ready-produced printing ink is separated from the steel balls.

Example 2A: (without aldehyde resin formed from urea and butyraldehyde)

A mixture of 75 parts by weight of the radiation-curable amine-modified polyether acrylate Laromer LR8894 and 25 parts by weight of the radiation-curable polyether acrylate Laromer P033F is prepared by stirring the components at 80° C.

75 parts by weight of this mixture are mixed with the additives as in Example 2 to form a printing ink.

II Properties of printing inks

The proportions of the binder components in the printing inks of Examples 1 and 1A to 1C were selected so that the viscosities of the resulting printing inks were very similar. As can be seen below in Table 1, the printing inks of Example 1 have the lowest yield point for the same viscosity. The yield point is defined as the load or shearing force at which the printing ink starts to flow.

TABLE 1

|  | Ex. 1 | Ex. 1A | Ex. 1B | Ex. 1C |
|---|---|---|---|---|
| Printing ink pigment = Heliogen Blue D7106: | | | | |
| Viscosity (Pa · s. 23° C.) | 2.2 | * | 4.3 | 2.2 |
| Yield point (Pa. 23° C.) | 20 | * | 40 | 20 |
| Printing ink pigment = Lithol Rubine D4577: | | | | |
| Viscosity (Pa · s. 23° C.) | 3.2 | 3.8** | 5.0 | 3.3 |
| Yield point (Pa. 23° C.) | 15 | 15** | 60 | 30 |
| Printing ink pigment = Sico Yellow D1361DD: | | | | |
| Viscosity (Pa · s. 23° C.) | 7.8 | 6.0*** | 7.0 | 8.0 |
| Yield point (Pa. 23° C.) | 50 | 5*** | 125 | 140 |

*The printing ink has polymerized after one day.
**The printing ink has partly polymerized after 1 day.
***The printing ink has partly polymerized after 3 days.

TABLE 2

|  | Example 2 | Example 2A |
|---|---|---|
| Printing ink pigment = Heliogen Blue D7106: | | |
| Viscosity (Pa · s. 23° C.) | 2.2 | 1.2 |
| Yield point (Pa. 23° C.) | 20 | 25 |
| Printing ink pigment = Lithol Rubine D4574: | | |
| Viscosity (Pa · s. 23° C.) | 3.0 | 1.5 |
| Yield point (Pa. 23° C.) | 1 | 15 |
| Printing ink pigment = Lithol Rubine D4577: | | |
| Viscosity (Pa · s. 23° C.) | 2.1 | 1.4 |
| Yield point (Pa. 23° C.) | 2 | 35 |
| Printing ink pigment = Sico Yellow D1358: | | |
| Viscosity (Pa · s. 23° C.) | 2.3 | 40 |
| Yield point (Pa. 23° C.) | 40 | 80 |

Despite a somewhat higher viscosity than the inks in Example 2A, the printing inks of Example 2, which include the mixture of condensation resin and radiation-curable binder, have a significantly lower yield point and hence better flowability, a better response on the press, and comparable reactivity.

The lower yield point makes it possible to prepare more highly pigmented, stronger printing inks and pigment concentrates.

We claim:
1. A mixture comprising
   a condensation resin A) constructed from urea or urea derivatives $a_1$) and ketones or aldehydes $a_2$) selected from acidic-CH aldehydes or ketones and their mixtures with formaldehyde, and
   a radiation-curable compound B) having at least 2 acryloyl or methacryloyl groups.
2. A mixture as claimed in claim 1, comprising
   from 10 to 90% by weight of said condensation resin A), and
   from 10 to 90% by weight of said compound B), based on the sum of A)+B).
3. A mixture as claimed in claim 1, wherein said condensation resin has a softening temperature within the range from 60 to 140° C.
4. A mixture as claimed in claim 1, wherein said condensation resin is constructed from $a_1$) and $a_2$) in a molar ratio within the range from 1:4 to 1:10.
5. A mixture as claimed in claim 1, wherein said ketones or aldehydes $a_2$) comprise
   from 50 to 100% by weight of acidic-CH aldehydes or ketones, and
   from 0 to 50% by weight of formaldehyde, based on the total amount of $a_2$).
6. A mixture as claimed in claim 1, wherein said acidic-CH aldehyde or ketone is isobutyraldehyde.
7. A mixture as claimed in claim 1, wherein said radiation-curable compound B) is a compound having from 2 to 20 acryloyl or methacryloyl groups.
8. A mixture as claimed in claim 1, wherein said radiation-curable compound B) has a number average molecular weight below 15,000 g/mol.
9. A mixture as claimed in claim 1, wherein B) comprises polyester acrylates or polyether acrylates.
10. A printing ink, comprising:
    the mixture as claimed in claim 1 as the binder component of the printing ink.
11. An offset printing ink, comprising:
    the mixture as claimed in claim 1 as the binder component of the offset printing ink.
12. A mixture as claimed in claim 1, said ketone or aldehyde containing an acidic-CH group has the formula:

III

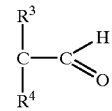

wherein $R^3$ and $R^4$ are each independently hydrogen, $C_1$–$C_{20}$ alkyl, aryl, or $C_7$–$C_{20}$-alkaryl, with the proviso that $R^3$ and $R^4$ are not both hydrogen.

* * * * *